United States Patent
TerBush et al.

(10) Patent No.: US 10,846,200 B2
(45) Date of Patent: *Nov. 24, 2020

(54) MID-METHOD INSTRUMENTATION

(71) Applicant: Cisco Technology, Inc., San Jose, CA (US)

(72) Inventors: Ryan Nicholas TerBush, San Francisco, CA (US); Haojun Li, San Francisco, CA (US); Anthony Kilman, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,797

(22) Filed: Nov. 14, 2018

(65) Prior Publication Data

US 2019/0079851 A1   Mar. 14, 2019

Related U.S. Application Data

(63) Continuation of application No. 15/338,454, filed on Oct. 31, 2016, now Pat. No. 10,223,237.

(51) Int. Cl.
*G06F 11/36* (2006.01)
(52) U.S. Cl.
CPC ............................. *G06F 11/3644* (2013.01)
(58) Field of Classification Search
None
See application file for complete search history.

(56) References Cited

U.S. PATENT DOCUMENTS

| 8,516,301 B2* | 8/2013 | Beck ..................... G06F 11/323 |
| | | 714/15 |
| 2013/0179868 A1* | 7/2013 | Greifeneder ........ G06F 11/3668 |
| | | 717/130 |

(Continued)

OTHER PUBLICATIONS

Moseley, "LoopProf: Dynamic Techniques for Loop Detection and Profiling", 2006, Published in Proceedings of the 2006 Workshop on Binary Instrumentation and Applications (WBIA), 2006 (Year: 2006).*

(Continued)

*Primary Examiner* — Hossain M Morshed
(74) *Attorney, Agent, or Firm* — Behmke Innovation Group LLC; James M. Behmke; James J. Wong

(57) ABSTRACT

A system for preforming mid-method instrumentation includes a processor; a memory; and one or more modules stored in the memory and executable by a processor to perform operations including: obtain bytecode representation of an application; identify a method in the bytecode including a beginning and an end of the method; identify lines of bytecode between the beginning and the end of the identified method; identify one or more of the lines of bytecode between the beginning and the end of the method to instrument with one or more interceptors; during runtime of the application, instrument the identified one or more of the lines of bytecode between the beginning and the end of the identified method by apply the one or more interceptors; and during the runtime of the application, receive information associated with the instrumented one or more lines of bytecode between the beginning and the end of the method.

20 Claims, 12 Drawing Sheets

(56) References Cited

U.S. PATENT DOCUMENTS

| | | | | |
|---|---|---|---|---|
| 2013/0247018 | A1* | 9/2013 | Chapman | G06F 9/4552<br>717/157 |
| 2014/0059527 | A1* | 2/2014 | Gagliardi | G06F 9/44521<br>717/166 |

OTHER PUBLICATIONS

Apache, "Intercept" 2015, 2015, Published at http://camel.apache.org/intercept.html (Year: 2015).*

JBoss, "Chapter 9. Interceptor", 2015, Published at https://docs.jboss.org/weld/reference/1.0.0/en-US/html/interceptors.html (Year: 2015).*

Klimov, "Java Bytecode Instrumentation Using Agent: Breaking into Java Application at Runtime", 2016, https://blogs.sap.com/2016/03/09/java-bytecode-instrumentation-using-agent-breaking-into-java-application-at-runtime/ (Year: 2016).*

Moseley, "LoopProf: Dynamic Techniques for Loop Detection and Profiling", 2006, In Proceedings of the 2006 Workshop on Binary Instrumentation and Applications (WBIA), 2006 (Year: 2006).*

Aarniala, "Instrumenting Java bytecode", 2005, http://studyres.com/doc/557931/instrumenting-java-bytecode (Year: 2005).*

Klimov, "Java Bytecode Instrumentation Using Agent: Breaking into Java Application at Runtime", Mar. 2016, at https://blogs.sap.com/2016/03/09/java-bytecode-instrumentation-using-agent-breaking-into-java-application-at-runtime/.

Aarniala, "Instrumenting Java bytecode", 2005, Seminar work for the compilers—course, spring 2005, at http://studyres.com/doc/557931/instrumenting-java-bytecode.

Apache, "Intercept", 2015, Apache Camel, at http://camel.apache.org/intercept.html.

JBoss, "Chapter 9. Interceptors", 2015, Published at https://docs.jboss.org/weld/reference/1.0.0/en-US/html/Interceptors.html.

Moseley, "LoopProf: Dynamic Techniques for Loop Detection and Profiling", 2006, In Proceedings of the 2006 Workshop on Binary Instrumentation and Applications (WBIA), 2006.

* cited by examiner

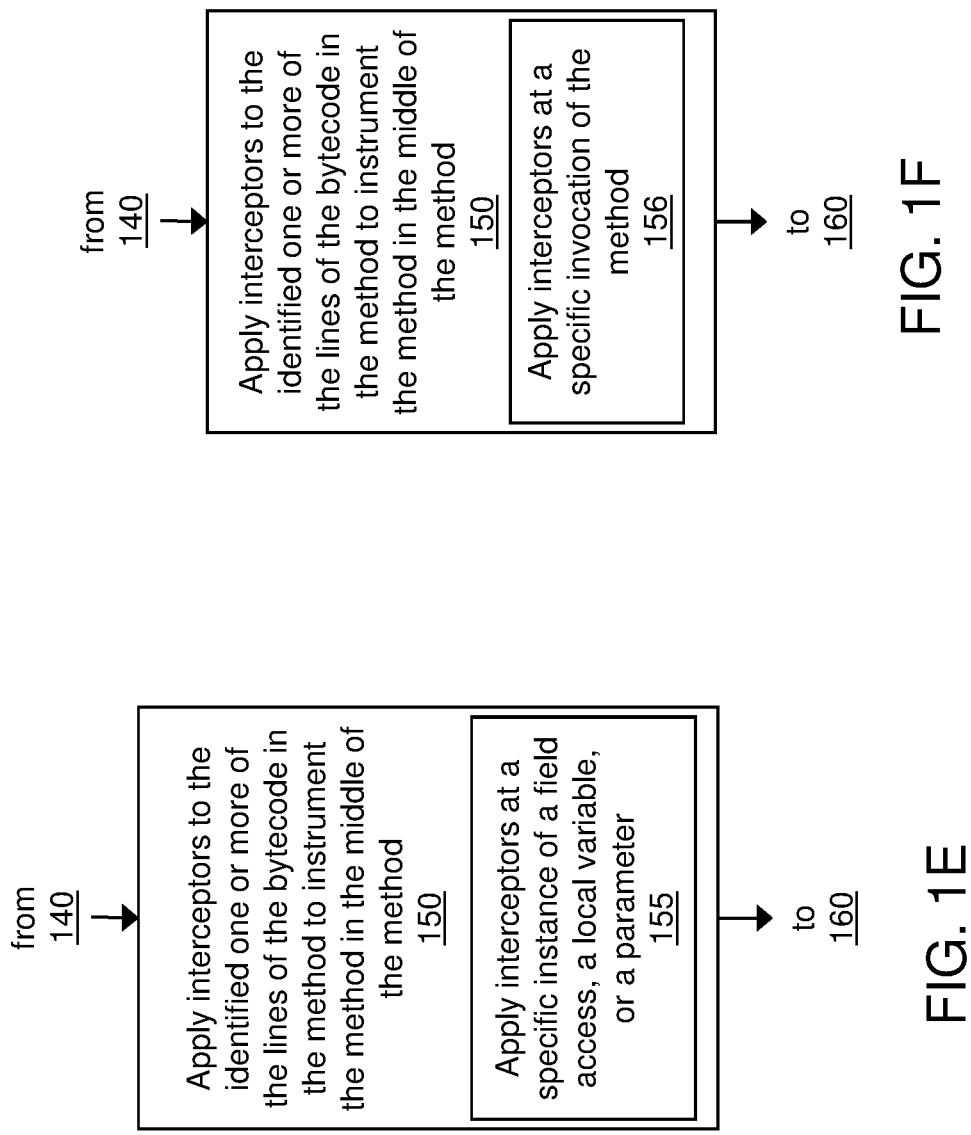

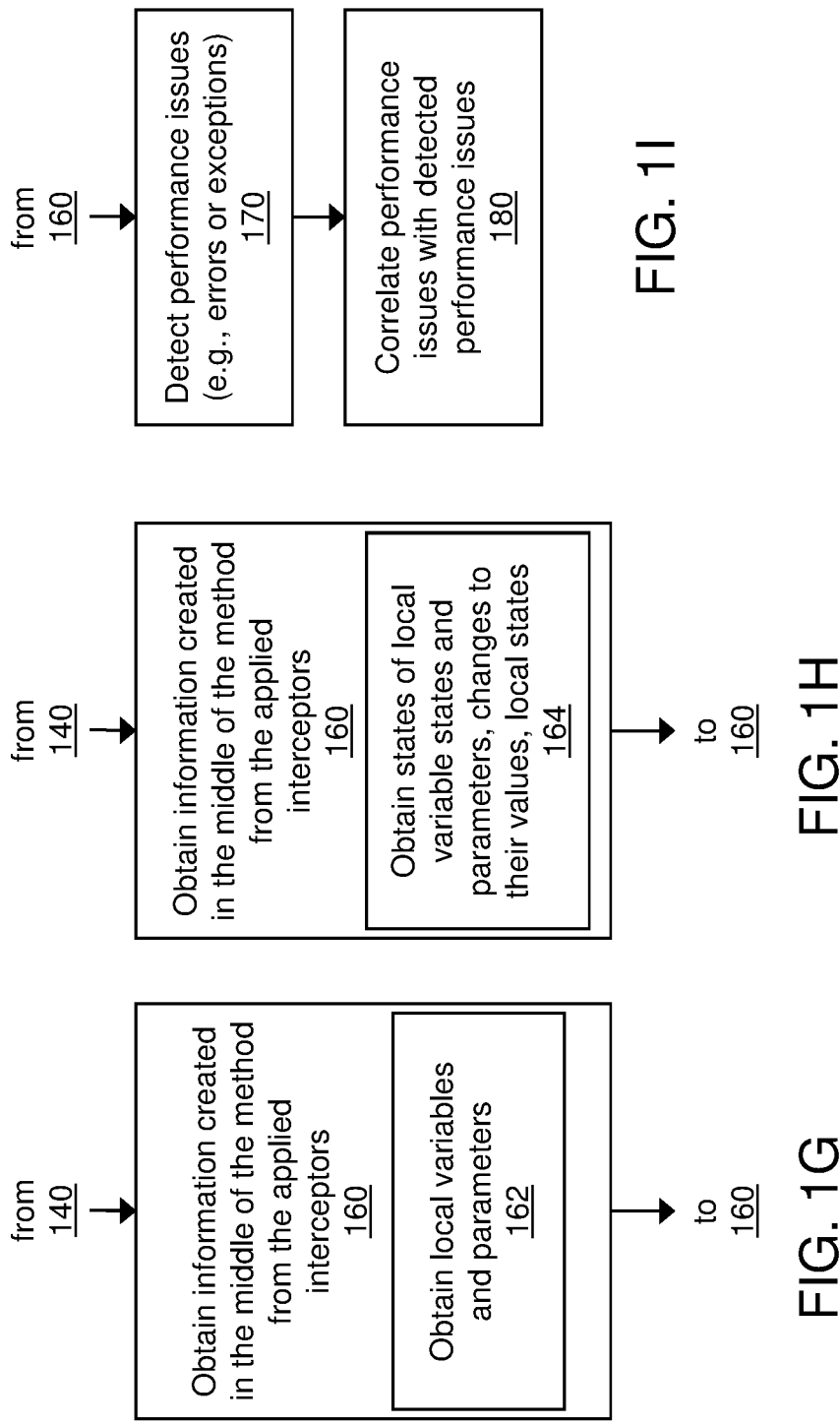

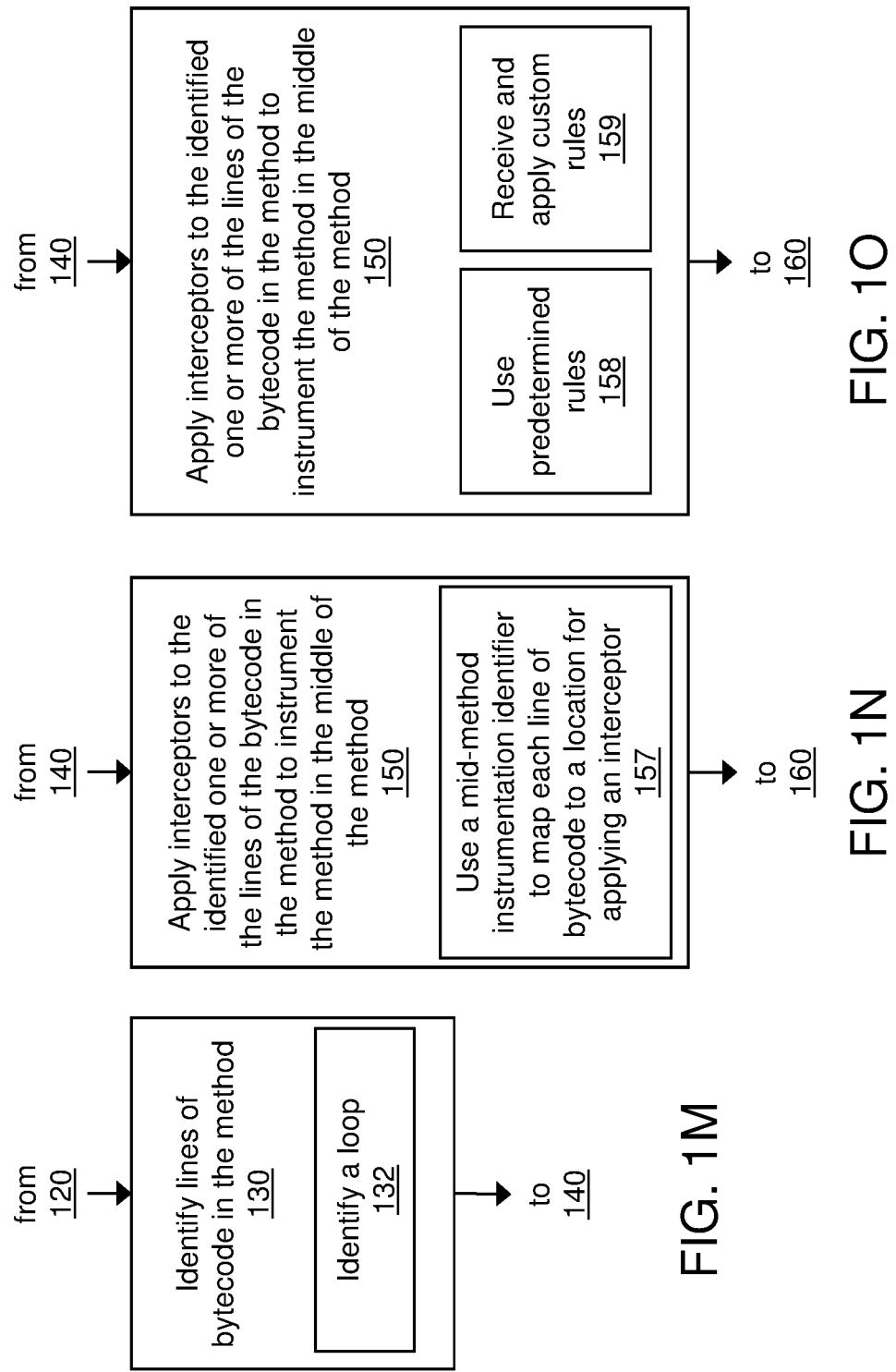

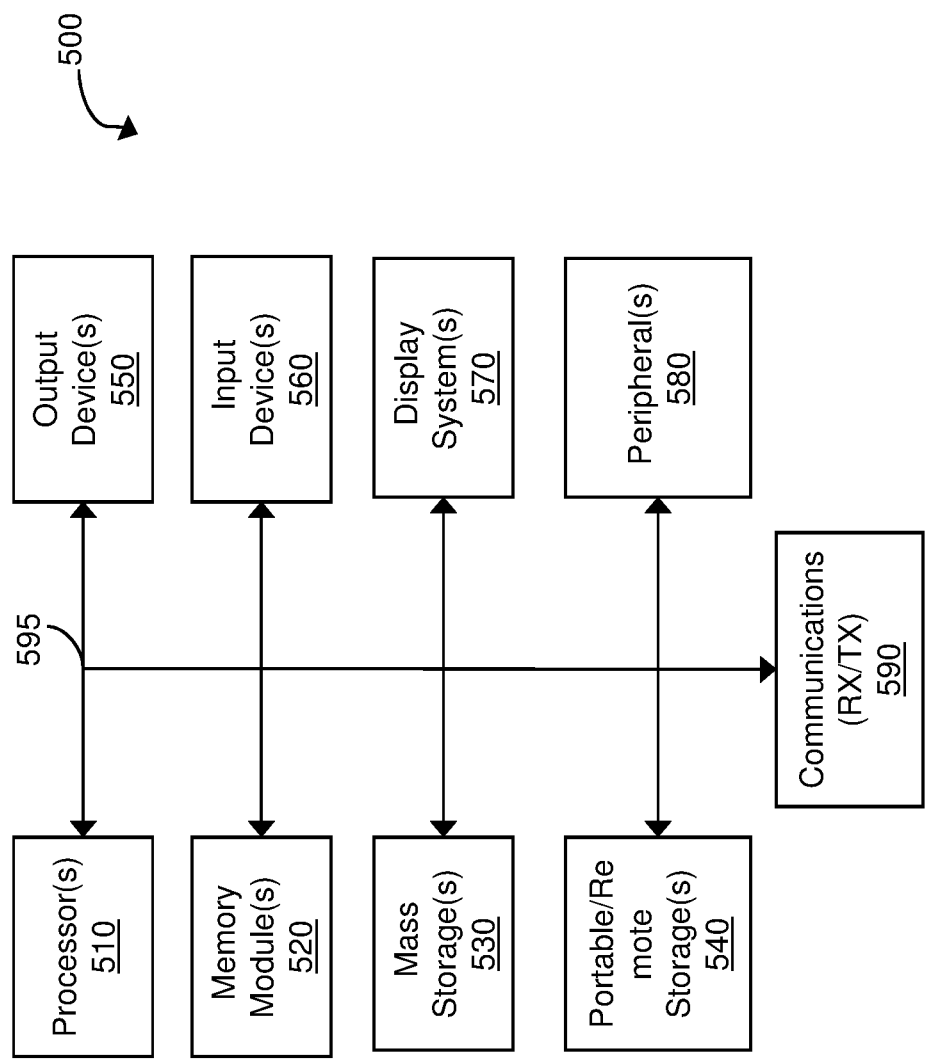

MID-METHOD INSTRUMENTATION

RELATED APPLICATION

This application is a Continuation Application of U.S. patent application Ser. No. 15/338,454, filed Oct. 31, 2016, entitled: "MID-METHOD INSTRUMENTATION", by Ryan Nicholas TerBush et al., the contents of which are herein incorporated by reference.

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of mid-method instrumentation are disclosed. Specifically, the disclosed mid-method instrumentation techniques can be used to collect data, including how variables change during a method to better understand and instrument a method. In addition, the disclosed mid-method instrumentation techniques can enable a monitoring program to instrument anywhere within a method rather than just the beginning and end of the method.

In one aspect, a system for performing mid-method instrumentation to monitor information from middle of a method in an application is disclosed. The system includes a processor; a memory; and one or more modules stored in the memory and executable by a processor to perform operations including: obtain bytecode representation of an application; identify a method in the bytecode including a beginning and an end of the method; identify lines of bytecode between the beginning and the end of the identified method; identify one or more of the lines of bytecode between the beginning and the end of the identified method to instrument with one or more interceptors; during runtime of the application, instrument the identified one or more of the lines of bytecode between the beginning and the end of the identified method by apply the one or more interceptors; and during the runtime of the application, receive information associated with the instrumented one or more lines of bytecode between the beginning and the end of the method.

The system can be implemented to include one or more of the following features. For example, the one or more modules can be executable to perform operations including: during the runtime of the application, detect an error or exception associated with the method in the application; and generate a report of the detected error or exception to include a stack trace associated with the detected error or exception and the received information associated with the instrumented one or more lines of bytecode between the beginning and the end of the method. The one or more modules can be executable to perform operations including: correlate the detected error or exception with the received the received information associated with the instrumented one or more lines of bytecode between the beginning and the end of the method. The received information associated with the instrumented one or more lines of bytecode between the beginning and the end of the method can include local variables or parameters. The received information associated with the instrumented one or more lines of bytecode between the beginning and the end of the method can include changes to the local variables or parameters. The one or more modules can be executable to perform operations including: target an interceptor at a specific read or write of the local variables or parameters. The one or more modules can be executable to perform operations including: target an interceptor at a specific invocation of the method. The one or more modules can be executable to perform operations including: identify a loop in the method. The one or more modules can be executable to perform operations including: target an interceptor at a specific invocation of the identified loop in the method. The one or more modules can be executable to perform operations including: target the interceptors to define a business transaction to begin or end at a location between the beginning and the end of the method. The one or more modules can be executable to perform operations including: apply a mid-method identifier to instrument the one or more lines of bytecode between the beginning and the end of the method, wherein the mid-method identifier includes a class name, a method name, and a location between the beginning and the end of the method. The one or more modules can be executable to perform operations including: provide a user interface that displays an interactive dashboard of the monitored application; and display, through the user interface, the generated report.

In another aspect, a method for performing mid-method instrumentation to monitor information from middle of a method in an application is disclosed. The method for performing mid-method instrumentation include: obtaining bytecode representation of an application; identifying a method in the bytecode including a beginning and an end of the method; identifying lines of bytecode between the beginning and the end of the identified method; identifying one or more of the lines of bytecode between the beginning and the end of the identified method to instrument with one or more interceptors; during runtime of the application, instrumenting the identified one or more of the lines of bytecode between the beginning and the end of the identified method by apply the one or more interceptors; and during the runtime of the application, receiving information associated with the instrumented one or more lines of bytecode between the beginning and the end of the method.

The method for performing mid-method instrumentation can be implemented in various ways to include one or more of the following features. For example, during the runtime of the application, the method for performing mid-method instrumentation can include detecting an error or exception associated with the method in the application; and generating a report of the detected error or exception to include a stack trace associated with the detected error or exception and the received information associated with the instrumented one or more lines of bytecode between the beginning and the end of the method. The method for performing mid-method instrumentation can include correlating the detected error or exception with the received the received information associated with the instrumented one or more lines of bytecode between the beginning and the end of the method. The received information associated with the instrumented one or more lines of bytecode between the beginning and the end of the method can include local variables or parameters. The received information associated with the instrumented one or more lines of bytecode between the beginning and the end of the method can include changes to the local variables or parameters. The method for performing mid-method instrumentation can include targeting an interceptor at a specific read or write of the local variables or parameters. The method for performing mid-method instrumentation can include targeting an interceptor at a specific invocation of the method. The method for performing mid-method instrumentation can include identifying a loop in the method. The method for performing mid-method instrumentation can include targeting an interceptor at a specific invocation of the identified loop in the method. The method for performing mid-method instrumentation can include targeting the interceptors to define a business transaction to begin or end at a location between the beginning and the end of the method. The method for performing mid-method instrumentation can include applying a mid-method identifier to instrument the one or more lines of bytecode between the beginning and the end of the method, wherein the mid-method identifier includes a class name, a method name, and a location between the beginning and the end of the method. The method for performing mid-method instrumentation can include providing a user interface that displays an interactive dashboard of the monitored application; and displaying, through the user interface, the generated report.

In yet another aspect, a non-transitory computer readable medium embodying instructions when executed by a processor to cause operations to be performed for mid-method instrumenting to monitor information from middle of a method is disclosed. The operations include obtaining bytecode representation of an application; identifying a method in the bytecode including a beginning and an end of the method; identifying lines of bytecode between the beginning and the end of the identified method; identifying one or more of the lines of bytecode between the beginning and the end of the identified method to instrument with one or more interceptors; during runtime of the application, instrumenting the identified one or more of the lines of bytecode between the beginning and the end of the identified method by apply the one or more interceptors; and during the runtime of the application, receiving information associated with the instrumented one or more lines of bytecode between the beginning and the end of the method.

The non-transitory computer readable medium can be implemented in various ways to include one or more of the following features. For example, the operations can include during the runtime of the application, detecting an error or exception associated with the method in the application; and generating a report of the detected error or exception to include a stack trace associated with the detected error or exception and the received information associated with the instrumented one or more lines of bytecode between the beginning and the end of the method. The operations can include: correlating the detected error or exception with the received the received information associated with the instrumented one or more lines of bytecode between the beginning and the end of the method. The received information associated with the instrumented one or more lines of bytecode between the beginning and the end of the method can include local variables or parameters. The received information associated with the instrumented one or more lines of bytecode between the beginning and the end of the method can include changes to the local variables or parameters. The operations can include: targeting an interceptor at a specific read or write of the local variables or parameters. The operations can include: targeting an interceptor at a specific invocation of the method. The operations can include: identifying a loop in the method. The operations can include: targeting an interceptor at a specific invocation of the identified loop in the method. The operations can include: targeting the interceptors to define a business transaction to begin or end at a location between the beginning and the end of the method. The operations can include: applying a mid-method identifier to instrument the one or more lines of bytecode between the beginning and the end of the method, wherein the mid-method identifier includes a class name, a method name, and a location between the beginning and the end of the method. The operations can include: providing a user interface that displays an interactive dashboard of the monitored application; and displaying, through the user interface, the generated report.

BRIEF DESCRIPTION OF THE DRAWINGS

FIG. 5 is a block diagram of an exemplary computing system implementing the disclosed technology.

DETAILED DESCRIPTION

Figure 1A:
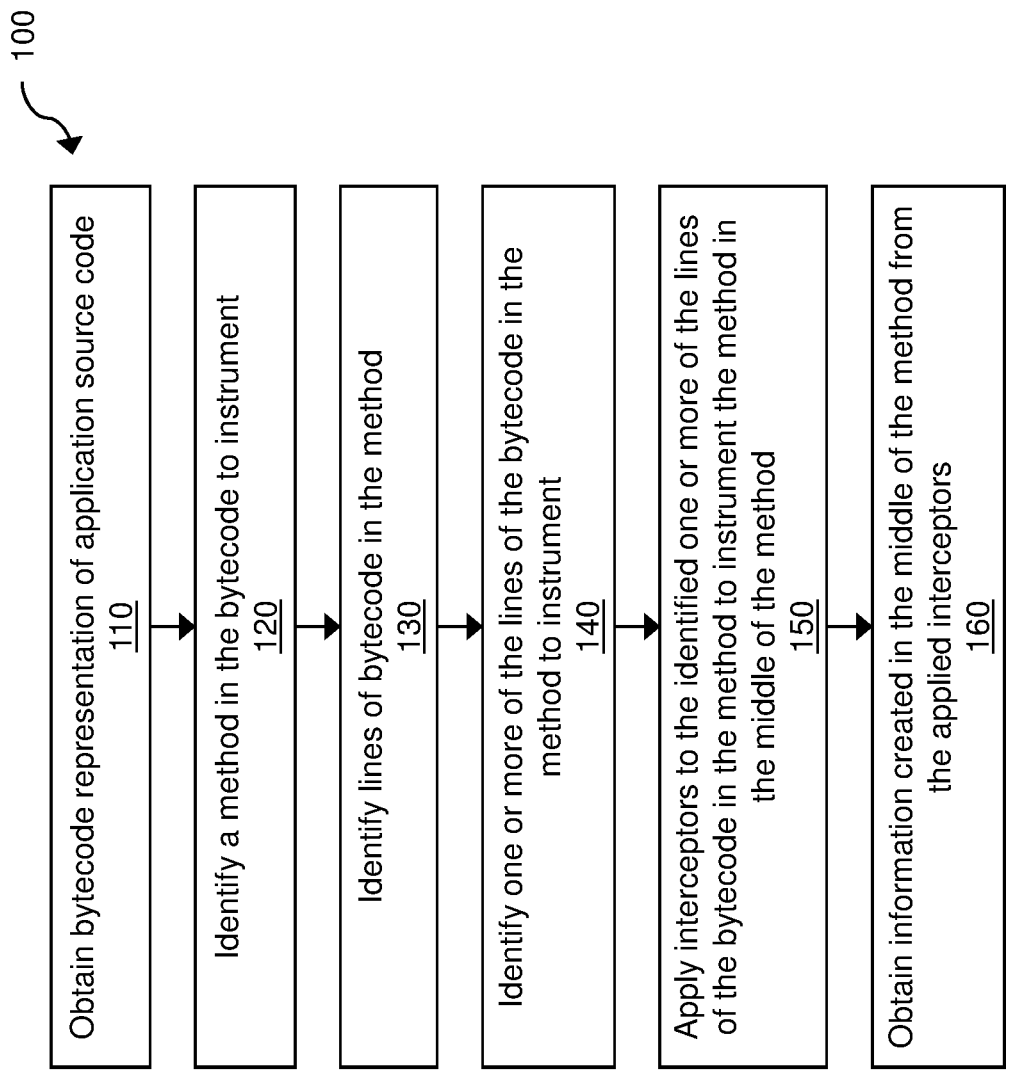
FIGS. 1A-1O are process flow diagrams of exemplary processes 100 and 102 for performing mid-method instrumentation.
Figure 1D:
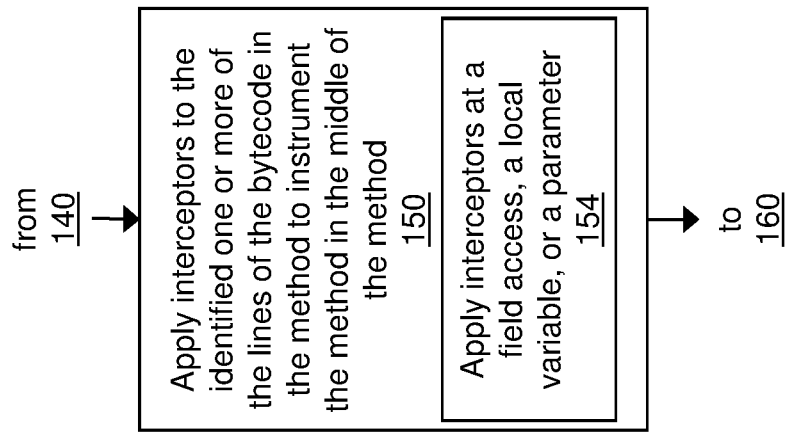
Figure 1C:
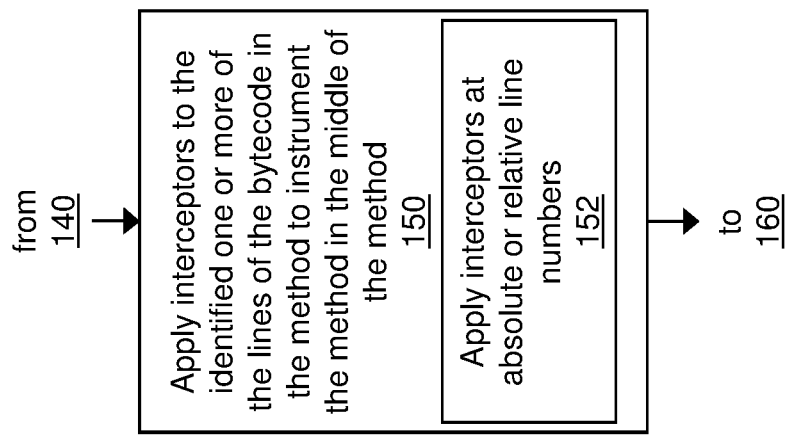
Figure 1B:
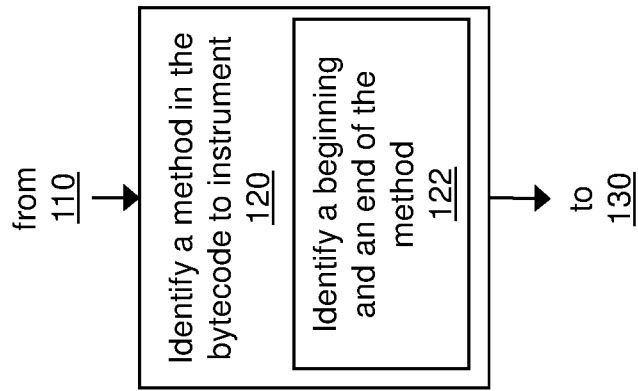
Figure 1K:
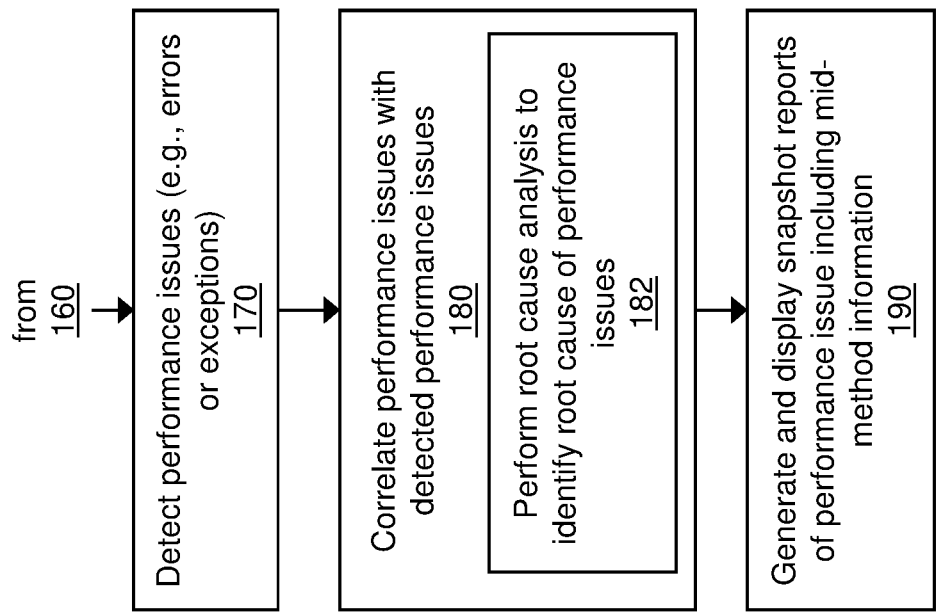
Figure 1J:
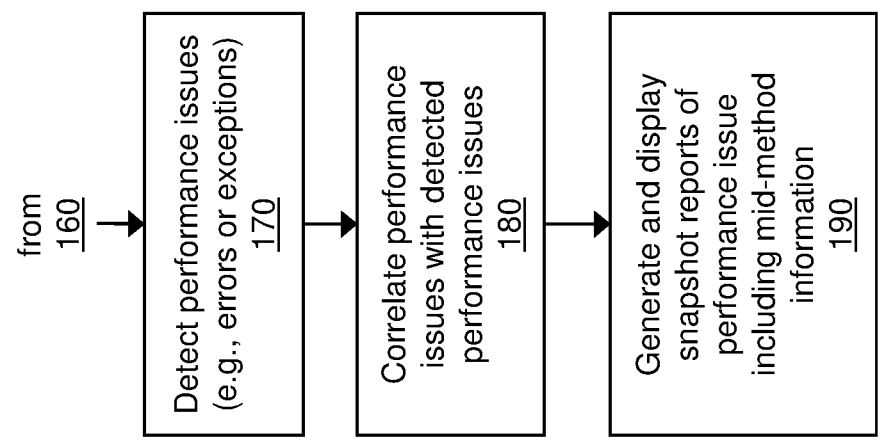
Figure 1L:
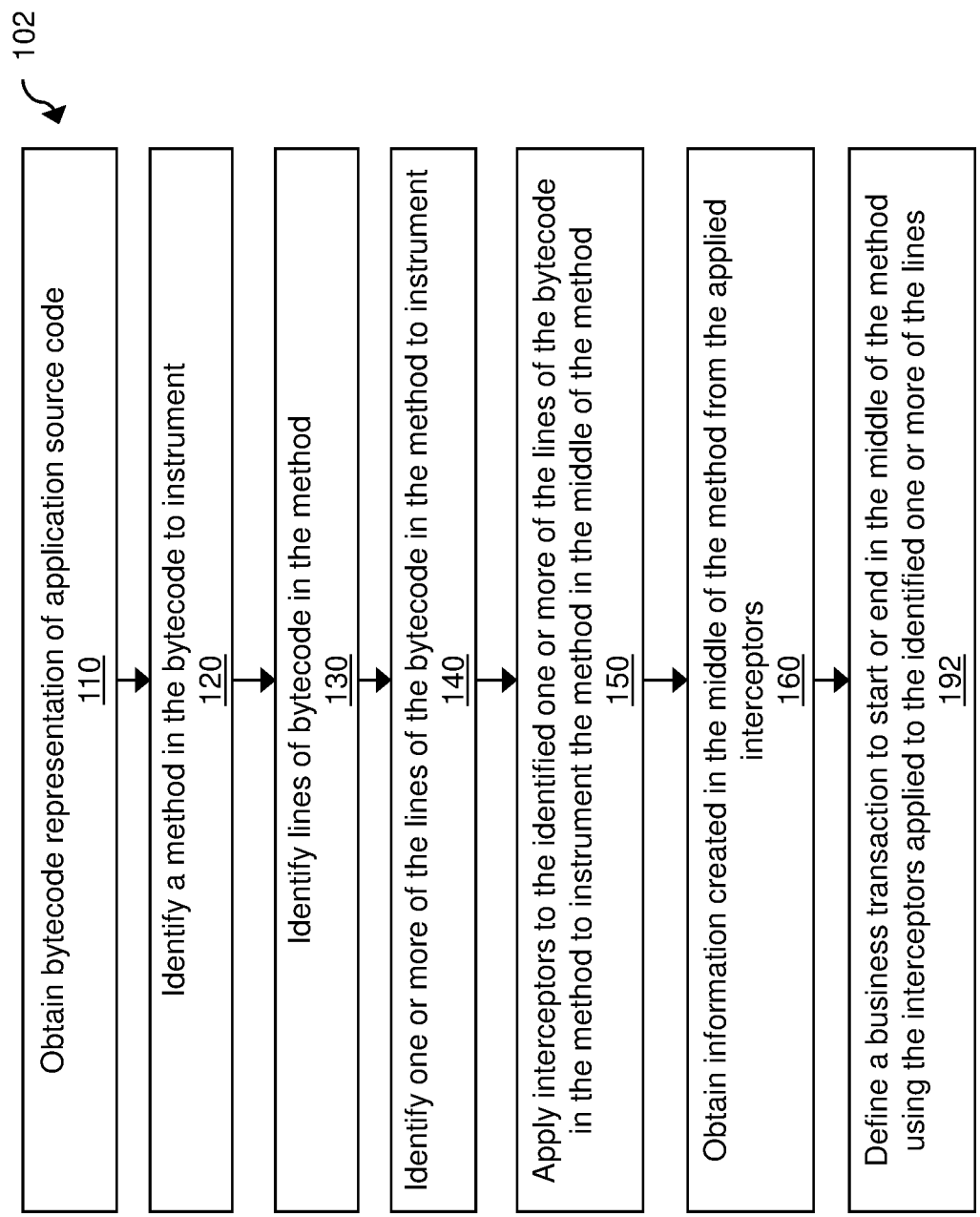

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and end user experience, each web application can be monitored to provide insight into information that can negatively affect the overall performance of the web application, which can cause negative end user experience. To monitor a given application, any given method can be instrumented and monitored by applying interceptors to different locations in the application code. To determine locations in the application for applying the interceptors, a class name and a method that indicate where in the application code to intercept. In general, the beginning and the end of a method are identified as the location for applying the interceptors because the beginning and the end of the method includes valuable information. For example, the beginning of a method includes parameter values, the invoked objects, the class name, and the method name. The end of a method includes the return value and information on any exceptions thrown. However, when instrumenting only at the beginning and end of the method, valuable information about the method that occurs in the middle of the method are lost. Specifically, local variables are created in the middle of the method and are only retain during the operation of the method and at the end of the method only the resulting end values are retained. For example, the variables within a method, such as a recursive loop may change during the method before settling on the final value at the end of the loop. When instrumenting only at the beginning and end of the method, the valuable information on how the variables changed during the method will be lost.

Mid-Method Instrumentation Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to perform mid-method instrumentation. The disclosed technology for mid-method instrumentation applies interceptors anywhere in the middle of a method to access the local variables and other information that are created during the middle of the method operation. The term "middle" is intended to indicate not only the exact mid-point of the method but anywhere in between the beginning and the end of the method. Thus, the disclosed technology for mid-method instrumentation can be used to inject an interceptor at any line of code between the beginning and the end of the method. The disclosed technology enables not only the ability to access the local variables and information that are created during the method, the disclosed technology enables a business transaction to be defined to include not just the entire method but also a portion (a single line of code) of the method.

Mid-Method Instrumentation Process

FIGS. 1A-1O are process flow diagrams of exemplary processes 100 and 102 for performing mid-method instrumentation. The various aspects of the processes 100 and 102 can be combined together. The disclosed processes 100 and 102 for performing mid-method instrumentation provide improved visibility into the middle of a method by being able to obtain information that are temporarily created in the middle of the method and then are lost at the end of the method. Thus, the disclosed mid-method instrumentation enables the collection of information created somewhere between the beginning and the end of a method in addition to the beginning and end of the method.

Bytecode representation of an application source code is obtained (110). One example way of obtaining the bytecode is to debug the code compiled at runtime. Interceptors are applied in the middle of a method (i.e., to any line(s) of code between the beginning and the end) of the method. A method is identified in the bytecode to be instrumented (120). Identifying the method can include identifying the beginning and the end of the method (122). The method is analyzed to identify the different lines of bytecode in the middle of the method (i.e., between the beginning and the end of the method) (130). One or more of the lines of bytecode in the middle of the method can be identified for instrumentation (140). Interceptors are applied to the identified one or more lines of the bytecode in the middle of the method (150). Information created in the middle of the method are received from the interceptors (160).

The interceptors can be applied at an absolute line number and a relative line number of the bytecode in the middle of a method (152). The relative line number is relative to the beginning of the method. Also, the interceptors can be applied at certain field access, at a local variable, or a parameter (154). Also, the interceptors can be applied to a specific instance of the field access, local variable, or parameter, such as specific instance of read or write of the local variable (e.g., the third write of the local variable or the second read of the local variable) (155). In some implementations, the interceptors can be applied to a specific invocation of the method (e.g., the fourth invocation of the method) (156), or any other information that are created and exist only in the middle of the method.

The mid-method information accessed can be collected and saved, for example, including local variables and parameters (162). In addition, the collected mid-method information can include the states of the local variable states and parameters, changes to their values, local states, etc. (164). The mid-method information can be obtained as snapshots. For example, some of the parameter values can change (e.g., mutate) in the middle of the method but then change back at the end of the method. When only the beginning and the end of the method are instrumented, such change in the parameter values cannot be collected.

In some implementation, performance issues (e.g., errors or exceptions) in the application are detected by agents (170). The mid-method information obtained through the mid-method instrumentation, such as the changes to the local variables changes can be accessed and collected for correlating with performance data of the application, for example (180). A snapshot report including the stack trace associated with the detected performance issues is collected. In addition to the stack trace, the mid-method instrumentation technique can be used to collect the local variables that led to or are associated with the performance issues and reported in the snapshot report (190). Thus, the stack trace and the local variables combined can be used to debug or perform root cause analysis of the performance issues (182).

For example, an exception or error can be caused by a user setting a parameter or a variable to a certain value. Because the disclosed mid-method instrumentation techniques can be used to obtain the local variables and parameters, how the local variables and parameters were set, and how the local variables and parameters were changed, the relationship between the information created during the middle of the method and the detected exception or error can be determined.

The information collected from the middle of a method can be used to report performance metrics about events that occur inside the method. For example, for a checkout method for an online shopping application, certain intermediate information about the shopping cart may be desirable to know and metrics about the intermediate information can be reported along with any errors or exceptions detected, for example.

The information collected from the middle of a method can be used to add additional valuable information about the method to the snapshot report generated and displayed on a dashboard by the collector. For example, when a business transaction occurs, an end-to-end view of the business transaction is displayed on the dashboard. In addition to the end-to-end information, the mid-method information obtained using the mid-method instrumentation techniques can provide valuable insight into the state of a specific method at any given point in the method that can be correlated with the detected performance issues.

For defining a business transaction, the mid-method instrumentation techniques can be used to start or end the business transaction not only at the beginning or end of a method, but also anywhere in the middle of a method (192). Thus, an exemplary business transaction can start at a beginning of one method and end in the middle of the same method. In another example, a business transaction can start in the middle of a method and end in the end of the same method. In yet another example, a business transaction can start after the beginning of a method and end before the end of the method. In yet another example, a business transaction can start at the beginning of a method and end in the middle of a different method. In yet another example, a business transaction can start in the middle of a method and end in the middle of a different method. These and other combinations of beginning, middle, and end of one or more methods can be used to start and end any given business transaction.

In some implementations, the mid-method instrumentation can be used to identify a loop (132). The ability to perform mid-method instrumentation enables a business transaction to be started in the middle of a method that includes a recursive loop. For example, a business transaction can start at the beginning of a loop in the middle of a method and end at the end of the loop in the middle of the same method.

In some implementations the ability to perform mid-method instrumentation enables a business transaction to be started at the beginning of a jump instruction in the middle of a method that jumps to a different portion of the application code outside the method. For example, in the middle of a method, a conditional jump instruction may call a different method, or a piece of code outside of the method. The ability to perform mid-method instrumentation allows such jumps to be intercepted and monitored as a part of a business transaction.

By instrumenting such loops and conditional jumps in the middle of a method, the initial setting of parameters and local variables can be collected. In addition, any changes to the parameters and local variables can be tracked as the loops and conditional jumps are performed in the method. Also, a timer can be used to determine how fast or slow each event, such as the changes to the parameters and local variables occur in the loops and conditional jumps.

In some implementations, the mid-method instrumentation techniques can be used to implement a mid-method instrumentation identifier that maps to an instrumentation point in the middle of a method where the interceptor is applied (157). In practice, multiple mid-method instrumentation identifiers can be used to map to multiple points inside a method in addition to instrumentation identifier applied at the beginning and end of the method. Each mid-method instrumentation identifier includes information on the method to be instrumented including the class name, method name, and a location (i.e., absolute line number or a relative line number) in the method.

Instrumentation Rules

ASM library is used to walk through the bytecode instructions of the application code line by line to identify interceptor points in the bytecode including the beginning, end, and any point (at any line or before or after any line) in the middle of a method. A predetermined set of rules can be used to provide predetermine instrumentation points (158). Then additional rules can be specified (e.g., through the dashboard user interface or an SDK). In addition, custom rules can be created in real time to instrument additional lines of code in the middle of a method. For example, when a user desires to define the start of a business transaction at the location of a loop in the middle of a method, a new rule for instrumenting that loop with an interceptor can be created live and received by the collector for retransforming the classes (159). The newly created rule is incorporated into the instrumentation rules, and the classes can be retransformed and instrumented during runtime.

Instrumenting Loops

In some implementations, mid-method instrumentation can be used to pin-point a line of bytecode to instrument with an interceptor based on a loop or a jump instruction. For example, instrumenting a loop inside a method can be performed using the mid-method instrumentation techniques to identify a beginning of a loop where certain local variables and parameters will be first created and identify the instrumentation point to a specific line number of the bytecode where the local variables and parameters will be assigned a value. This way, the mid-method instrumentation techniques can be used to avoid instrumenting at a line number where the local variables and parameters do not yet exist. For a conditional jump instruction, the mid-method instrumentation can be used to avoid jumps away from the desired local variables and parameters since such jumps may not return or only return under certain conditions. For example, a rule to instrument after line number 19 of bytecode that conditionally jumps to a different portion of the code may not obtain the same result as a rule to instrument before line number 20 since the conditional jump may never return to line 20. In such instances, the rule to inject before line 20 may never be implemented.

Loop Detection

After compilation of Java code, for example, the resultant bytecode lack indication of loops in the code. In some implementations, the mid-method instrumentation techniques can be used to identify loops in the bytecode. The bytecode instructions can be analyzed to detect a jump instruction to a known label, variable, line of code, etc. Such jump instruction can be deemed to be a loop because a loop returns to a known label, variable, line of code, etc.

Once a loop is detected, additional information about the loop can be obtained. For example, the number of times a loop is invoked or iterated can be determined. A specific iteration of a loop can also be identified to specifically instrument the 4th iteration of the loop, for example. Each iteration of a loop can be timed to determine how long it takes for the loop to finish during each iteration. Metrics about the loop can be collected to determine whether a given iteration of the loop is taking longer than other iterations by comparing against the average time, min time, max time, etc.

The disclosed loop detection using the disclosed mid-method instrumentation are performed during runtime without modifying the source code of the monitored application. Thus, the loop detection and mid-method instrumentation are performed while the application is running without having to stop the application, modify the source code, and recompile the application.

Figure 2A:
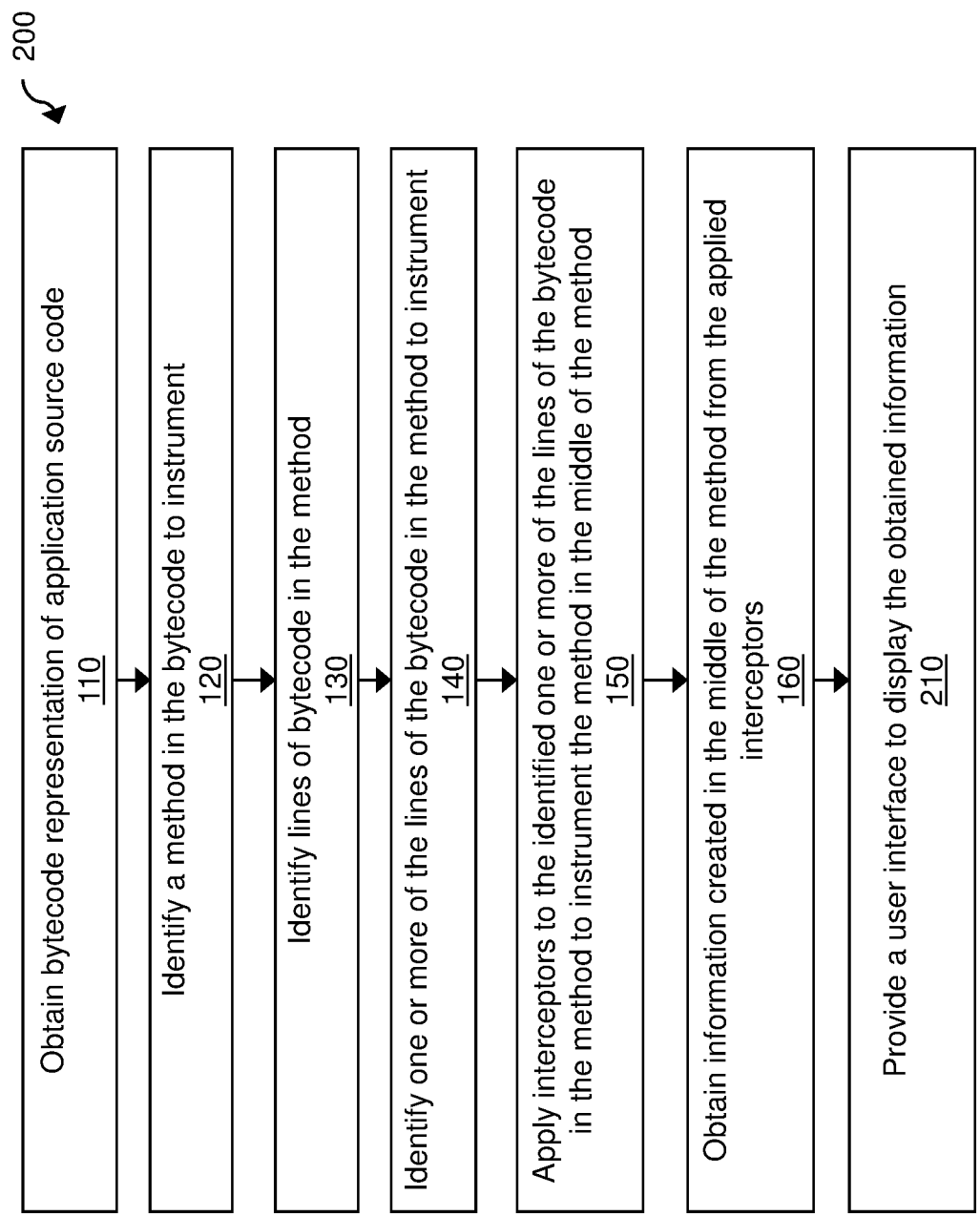
FIGS. 2A and 2B are process flow diagrams of exemplary processes 200 and 202 for providing a user interface to display information from mid-method instrumentation disclosed with respect to FIGS. 1A-1O.
Figure 2B:
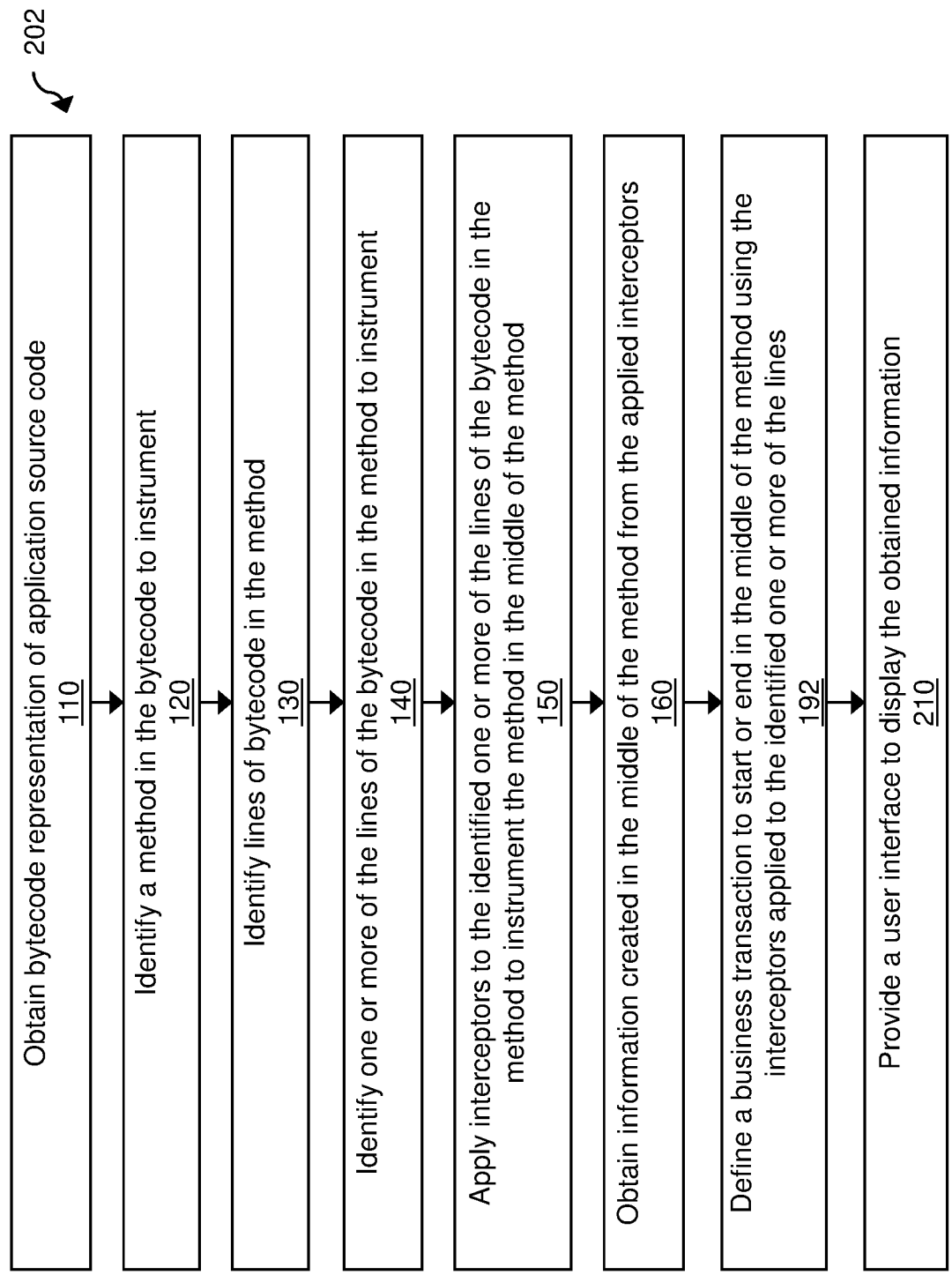

FIGS. 2A and 2B are process flow diagrams of exemplary processes 200 and 202 for providing a user interface to display the mid-method information as a part of the snapshot reports. The processes 200 and 202 are substantially similar to processes 100 and 102 disclosed in 1A-1O in that any of the features of the processes 100 and 102 can be included in processes 200 and 202. In addition to those features, processes 200 and 202 include providing a user interface to display the obtained mid-method instrumentation information on the middle of the method. The various information created during the method as discussed above can be displayed in a snapshot report along with a stack trace for any detected performance issues (e.g., errors or exceptions) for example. A dashboard display can be provided to display the mid-method instrumentation information.

Application Intelligence Platform Architecture

Figure 3:
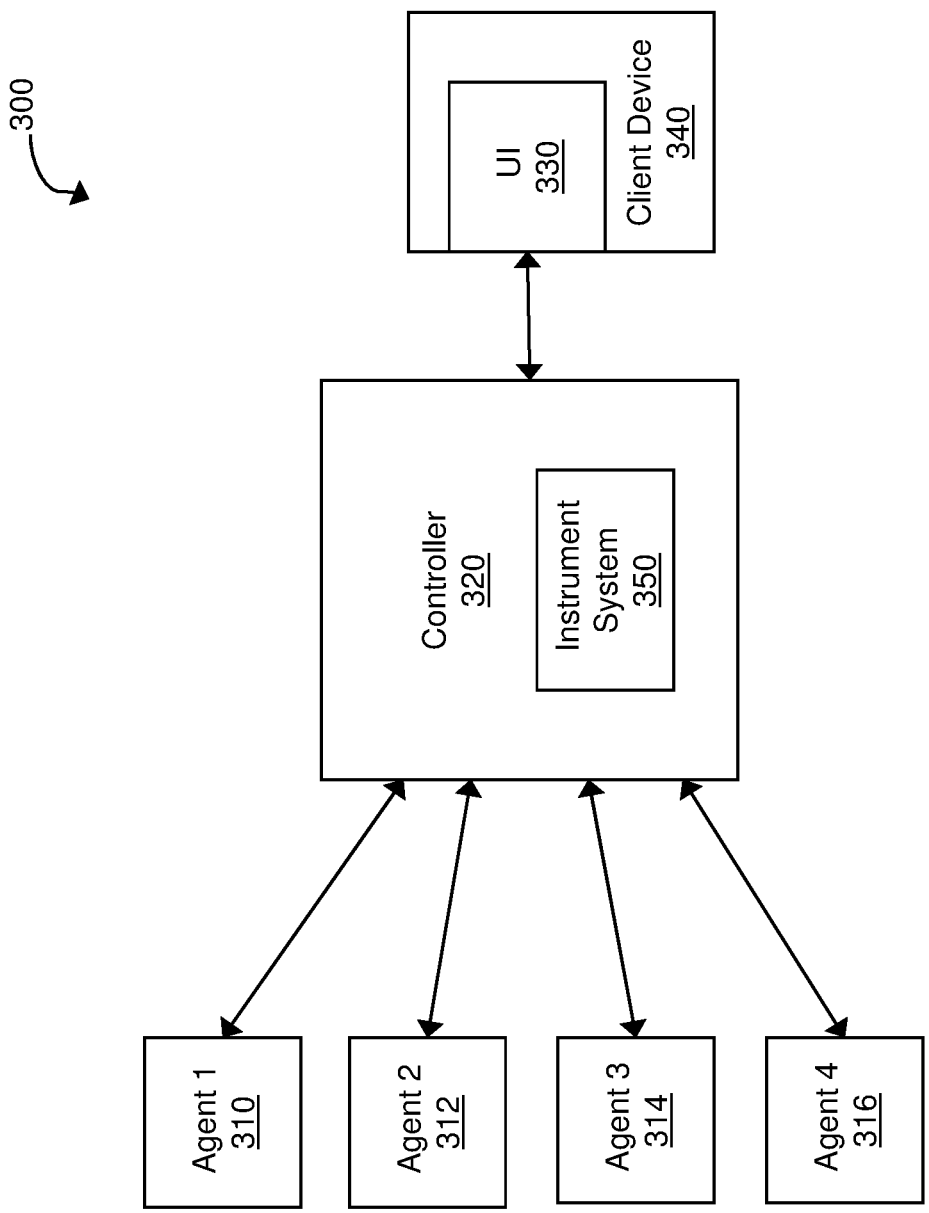
FIG. 3 is a block diagram of an exemplary application intelligence platform that can implement the mid-method instrumentation as disclosed in this patent document.

FIG. 3 is a block diagram of an exemplary application intelligence platform 300 that can implement the mid-method instrumentation as disclosed in this patent document, including the processes disclosed with respect to FIGS. 1A-1O and 2A-2B. The application intelligence platform is a system that monitors and collect metrics of performance data for an application environment being monitored. At the simplest structure, the application intelligence platform includes one or more agents 310, 312, 314, 316 and one or more controllers 320. While FIG. 3 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions distributed over application servers. Specifically, the controller 320 can receive runtime data from agents 310, 312, 314, 316 and coordinators, associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data.

In the Software as a Service (SaaS) implementation, a controller instance 320 is hosted remotely by a provider of the application intelligence platform 300. In the on-premise (On-Prem) implementation, a controller instance 320 is installed locally and self-administered.

The controllers 320 receive data from different agents 310, 312, 314, 316 deployed to monitor applications, databases and database servers, servers, and end user clients for the monitored environment. Any of the agents 310, 312, 314, 316 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser-database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs. Browser agents (e.g., agents 310, 312, 314, 316) can include Reporters that perform the automatic webpage loading detection as disclosed in this patent document.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 320 can include an instrumentation system 350 for displaying the mid-method information generated by the interceptors at the agents as disclosed in this patent document. In some implementations, the instrumentation system 350 can be implemented in a separate machine (e.g., a server) different from the one hosting the controller 320.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of application at a certain point in time. Snapshots usually include call graphs that allow that enables drilling down to the line of code that may be causing performance problems. The most common snapshots are transaction snapshots.

Exemplary Implementation of Application Intelligence Platform

Figure 4:
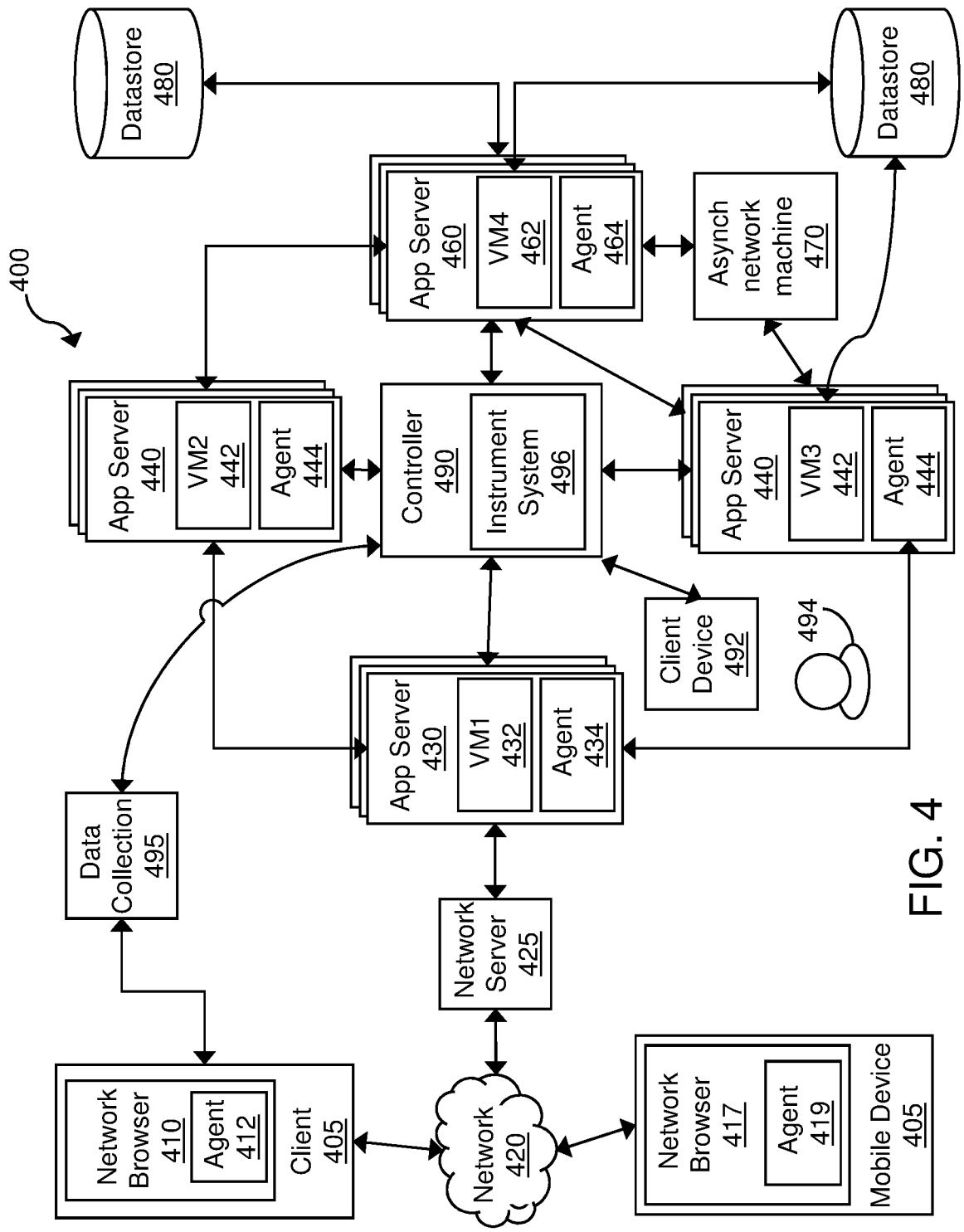
FIG. 4 is a block diagram of an exemplary system for performing mid-method instrumentation as disclosed in this patent document, including the processes disclosed with respect to FIGS. 1A-1O and 2A-2B.

FIG. 4 is a block diagram of an exemplary system 400 for performing mid-method instrumentation as disclosed in this patent document, including the processes disclosed with respect to FIGS. 1A-1O and 2A-2B. The system 400 in FIG. 4 includes client device 405 and 492, mobile device 415, network 420, network server 425, application servers 430, 440, 450 and 460, asynchronous network machine 470, data stores 480 and 485, controller 490, and data collection server 495. The controller 490 can include instrumentation system 496 for displaying the mid-method information generated by the interceptors as disclosed in this patent document. In some implementations, the instrumentation system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including a Report for automatic detection of webpage loading and report generating.

Mobile device 415 is connected to network 420 and may be implemented as a portable device suitable for sending and receiving content over a network, such as for example a mobile phone, smart phone, tablet computer, or another portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420.

Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e. "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454 and 464 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450 and 460 may include an application and agents. Each application may run on the corresponding application server. Each of applications 442, 452 and 462 on application servers 440-460 may operate similarly to application 432 and perform at least a portion of a distributed business transaction. Agents 444, 454 and 464 may monitor applications 442-462, collect and process data at runtime, and communicate with controller 490. The applications 432, 442, 452 and 462 may communicate with each other as part of performing a distributed transaction. In particular, each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444 and 454. Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or another computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452 and 462 may be any of several types of applications. Examples of applications that may implement applications 432-462 include a Java, PHP, .Net, Node.JS, and other applications.

FIG. 5 is a block diagram of a computer system 500 for implementing the present technology. System 500 of FIG. 5 may be implemented in the contexts of the likes of clients 405, 492, network server 425, servers 430, 440, 450, 460, a synchronous network machine 470 and controller 490.

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 620.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or another suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for performing mid-method instrumentation to monitor information from middle of a method, the system including:
   a processor;
   a memory; and
   one or more modules stored in the memory and executable by the processor to perform operations including:
      obtain bytecode representation of an application;
      identify a method in the bytecode representation including a beginning and an end of the method;
      identify a middle of the identified method, the middle of the method including one or more lines of bytecode between the beginning and the end of the identified method excluding the beginning and the end of the identified method;
      identify a loop in the middle of the identified method where local variables or parameters are created or used, wherein the local variables and parameters are only retained during operation of the identified method;
      execute the application; and
      during runtime of the application,
         instrument, at instrumentation points based on a predetermined set of rules, the identified one or more lines of bytecode including the one or more lines of bytecode in the identified loop by applying one or more interceptors, and
         receive information associated with the instrumented one or more lines of bytecode in the middle of the identified method, wherein the received information includes a flow map for a business transaction.

2. The system of claim 1, wherein the one or more modules are executable to perform operations including:
   during the runtime of the application, detect an error or exception associated with the identified method in the application; and
   generate a report of the detected error or exception to include a stack trace associated with the detected error or exception and the received information associated with the instrumented one or more lines of bytecode in the middle of the identified method.

3. The system of claim 2, wherein the one or more modules are executable to perform operations including:
   correlate the detected error or exception with the received information associated with the instrumented one or more lines of bytecode in the middle of the identified method.

4. The system of claim 1, wherein the received information associated with the instrumented one or more lines of bytecode in the middle of the identified method includes the local variables or parameters.

5. The system of claim 4, wherein the received information associated with the instrumented one or more lines of bytecode in the middle of the identified method includes changes to the local variables or parameters.

6. The system of claim 4, wherein the one or more modules are executable to perform operations including:
   target an interceptor at a specific read or write of the local variables or parameters.

7. The system of claim 1, wherein the one or more modules are executable to perform operations including:
   target an interceptor at a specific invocation of the identified method.

8. The system of claim 1, wherein the one or more modules are executable to perform operations including:
   target an interceptor at a specific invocation of the identified loop in the identified method.

9. The system of claim 1, wherein the one or more modules are executable to perform operations including:
   target the interceptors to define a business transaction to begin or end at a location in the middle of the identified method.

10. The system of claim 1, wherein the one or more modules are executable to perform operations including:
    apply a mid-method identifier to instrument the one or more lines of bytecode in the middle of the identified method, wherein the mid-method identifier includes a class name, a method name, and a location in the middle of the identified method.

11. The system of claim 1, wherein the one or more modules are executable to perform operations including:
    provide a user interface that displays an interactive dashboard of the application; and
    display, through the user interface, a generated report.

12. A method for performing mid-method instrumentation to monitor information from middle of a method in an application, including:
    obtaining bytecode representation of an application;
    identifying a method in the bytecode representation including a beginning and an end of the method;
    identifying a middle of the identified method, the middle of the method including one or more lines of bytecode between the beginning and the end of the identified method excluding the beginning and the end of the identified method;
    identifying a loop in the middle of the identified method where local variables or parameters are created or used, wherein the local variables and parameters are only retained during operation of the identified method;
    executing the application; and
    during runtime of the application,
       instrumenting, at instrumentation points based on a predetermined set of rules, the identified one or more lines of bytecode including the one or more lines of bytecode in the identified loop by applying one or more interceptors, and
       receiving information associated with the instrumented one or more lines of bytecode in the middle of the identified method, wherein the received information includes a flow map for a business transaction.

13. The method of claim 12, including:
during the runtime of the application, detecting an error or exception associated with the identified method in the application; and
generating a report of the detected error or exception to include a stack trace associated with the detected error or exception and the received information associated with the instrumented one or more lines of bytecode in the middle of the identified method.

14. The method of claim 13, including:
correlating the detected error or exception with the received information associated with the instrumented one or more lines of bytecode in the middle of the identified method.

15. The method of claim 12, wherein the received information associated with the instrumented one or more lines of bytecode in the middle of the identified method includes the local variables or parameters.

16. The method of claim 15, wherein the received information associated with the instrumented one or more lines of bytecode in the middle of the identified method includes changes to the local variables or parameters.

17. The method of claim 16, including:
targeting an interceptor at a specific read or write of the local variables or parameters.

18. The method of claim 12, including:
targeting an interceptor at a specific invocation of the identified method.

19. The method of claim 12, including:
applying a mid-method identifier to instrument the one or more lines of bytecode in the middle of the identified method to be instrumented, wherein the mid-method identifier includes a class name, a method name, and a location in the middle of the identified method.

20. A non-transitory computer readable medium embodying instructions when executed by a processor to cause operations to be performed for mid-method instrumenting to monitor information from middle of a method, the operations including:
obtaining bytecode representation of an application;
identifying a method in the bytecode representation including a beginning and an end of the method;
identifying a middle of the identified method, the middle of the method including one or more lines of bytecode between the beginning and the end of the identified method excluding the beginning and the end of the identified method;
identifying a loop in the middle of the identified method where local variables or parameters are created or used, wherein the local variables and parameters are only retained during operation of the identified method;
executing the application; and
during runtime of the application,
  instrumenting, at instrumentation points based on a predetermined set of rules, the identified one or more lines of bytecode including the one or more lines of bytecode in the identified loop by applying one or more interceptors, and
  receiving information associated with the instrumented one or more lines of bytecode in the middle of the identified method, wherein the received information includes a flow map for a business transaction.

* * * * *

UNITED STATES PATENT AND TRADEMARK OFFICE
CERTIFICATE OF CORRECTION

PATENT NO. : 10,846,200 B2  
APPLICATION NO. : 16/190797  
DATED : November 24, 2020  
INVENTOR(S) : Ryan Nicholas TerBush et al.

It is certified that error appears in the above-identified patent and that said Letters Patent is hereby corrected as shown below:

On the Title Page

Item (57) In the Abstract, please amend as shown:
A system for performing mid-method instrumentation In the Specification Column 13, Line 65, please amend as shown:
Snapshots provide a detailed picture of a given application at a Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*